United States Patent
Lei et al.

(10) Patent No.: US 12,192,868 B2
(45) Date of Patent: Jan. 7, 2025

(54) ADAPTIVELY SELECTING NETWORK APN FOR VEHICLE APPLICATION REMOTE COMPUTING DEMAND

(71) Applicant: FORD GLOBAL TECHNOLOGIES, LLC, Dearborn, MI (US)

(72) Inventors: Oliver Lei, Windsor (CA); Somak Datta Gupta, Novi, MI (US); Arpita Chand, Dearborn, MI (US); Jayanthi Rao, West Bloomfield, MI (US); Vladyslav Slyusar, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 384 days.

(21) Appl. No.: 17/744,244

(22) Filed: May 13, 2022

(65) Prior Publication Data
US 2023/0370822 A1 Nov. 16, 2023

(51) Int. Cl.
| | |
|---|---|
| H04W 64/00 | (2009.01) |
| G01S 5/02 | (2010.01) |
| H04W 4/02 | (2018.01) |
| H04W 4/44 | (2018.01) |
| H04W 8/18 | (2009.01) |

(52) U.S. Cl.
CPC ............ *H04W 4/44* (2018.02); *H04W 8/183* (2013.01); *H04W 64/00* (2013.01)

(58) Field of Classification Search
CPC ........ H04W 4/44; H04W 8/183; H04W 64/00
See application file for complete search history.

(56) References Cited

U.S. PATENT DOCUMENTS

| | | | |
|---|---|---|---|
| 8,311,858 B2 | 11/2012 | Everett et al. | |
| 9,179,488 B2 | 11/2015 | Lei et al. | |
| 10,582,412 B2 | 3/2020 | Link, II | |
| 2013/0304853 A1* | 11/2013 | Cooper | H04L 67/566 709/217 |
| 2015/0195364 A1* | 7/2015 | Petersen | H04L 41/344 713/168 |
| 2016/0066186 A1* | 3/2016 | Kim | H04M 15/66 455/406 |
| 2017/0265125 A1* | 9/2017 | Osterwise | H04W 48/16 |
| 2019/0319868 A1 | 10/2019 | Svennebring et al. | |
| 2020/0154305 A1 | 5/2020 | Link, II | |
| 2021/0021530 A1* | 1/2021 | Kim | H04W 4/48 |
| 2023/0209588 A1* | 6/2023 | Hoshino | G08G 1/09626 370/329 |

* cited by examiner

*Primary Examiner* — Moustapha Diaby
(74) *Attorney, Agent, or Firm* — Joseph Zane; BROOKS KUSHMAN P.C.

(57) ABSTRACT

Managing vehicle application usage of computing resources is provided. A request for computing resources of a communications network is received from a vehicle application installed to a vehicle. An access point name (APN) is assigned to the vehicle application based on an application identifier corresponding to the vehicle application by accessing stored APN information including a mapping of application identifiers to corresponding APNs. The computing resources are accessed by the vehicle application connecting to the communications network using the APN.

17 Claims, 4 Drawing Sheets

ADAPTIVELY SELECTING NETWORK APN FOR VEHICLE APPLICATION REMOTE COMPUTING DEMAND

TECHNICAL FIELD

Aspects of the present disclosure generally relate to adaptively selecting network access point name (APN) for vehicle application remote computing demand.

BACKGROUND

An APN may refer to a gateway between a network to which a vehicle is attached and a greater network such as the public Internet. A vehicle making a data connection may be configured with an APN to present to a carrier. The carrier may utilize the APN identifier to connect the vehicle to network resources in accordance with the parameters associated with the APN.

SUMMARY

In one or more illustrative examples, a system for managing vehicle application usage of computing resources is provided. The system includes one or more vehicle controllers of a vehicle programmed to receive a request for computing resources of a communications network from a vehicle application installed to the vehicle; assign an APN to the vehicle application based on an application identifier corresponding to the vehicle application by accessing stored APN information including a mapping of application identifiers to corresponding APNs; and access the computing resources by the vehicle application connecting to the communications network using the APN.

In one or more illustrative examples, a system for managing vehicle application usage of computing resources is provided. The system includes a management server programmed to receive updated information with respect to performance of computing resources of a plurality of multi-access edge computing devices (MECs) and/or cloud systems accessible to vehicle applications over a communications network; generate APN information mapping of application identifiers of the vehicle applications to corresponding APNs; and push the APN information to vehicles to allow the vehicles to assign APNs to the vehicle applications based on application identifiers corresponding to the vehicle applications.

In one or more illustrative examples, a method for managing vehicle application usage of computing resources is provided. A request for computing resources of a communications network is received from a vehicle application installed to a vehicle. An APN is assigned to the vehicle application based on an application identifier corresponding to the vehicle application by accessing stored APN information including a mapping of application identifiers to corresponding APNs. The computing resources are accessed by the vehicle application connecting to the communications network using the APN.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

MECs and traditional cloud servers may be used to assist vehicle applications for remote computing. A vehicle may include a telematics control unit (TCU) subscriber identity module (SIM) configured to use a single network APN for vehicle applications that utilize remote computing assistance. The vehicle applications may have various network demands. For instance, some applications may require broadband access, some applications desire a low latency connection, and some applications may require high computing assistance. However, a single APN to a single MEC or cloud may be unable to meet requirements for various vehicles applications.

An improved MEC system may be configured to program the TCU SIM of the vehicle with multiple APNs. These APNs may direct the vehicle's network traffic to different MECs or cloud servers based on various factors. Each MEC server or cloud may have its own abilities, such as low latency, high computing power, broadband, etc. Based on different vehicle application demands and vehicle current location, the TCU may selectively use different APNs to meet the application requirements. The MEC server may be used for local computing with low latency, while traditional cloud server can be far away with non-critical latency computing. There can be multiple MECs and/or cloud servers with different computing capabilities. Or there may be MECs with the same capabilities to provide redundancy. Based on the vehicle location, the TCU may update to utilize the latest MECs and cloud capabilities so that it can provide appropriate APN to the applications in real-time. The original equipment manufacturer (OEM) or other manager may also reduce the quantity of MECs instances based on requirements (e.g., during night) to save cost, thus the TCU may also be able to assign multiple applications to a single APN. Further aspects of the disclosure are discussed in detail herein.

Figure 1:
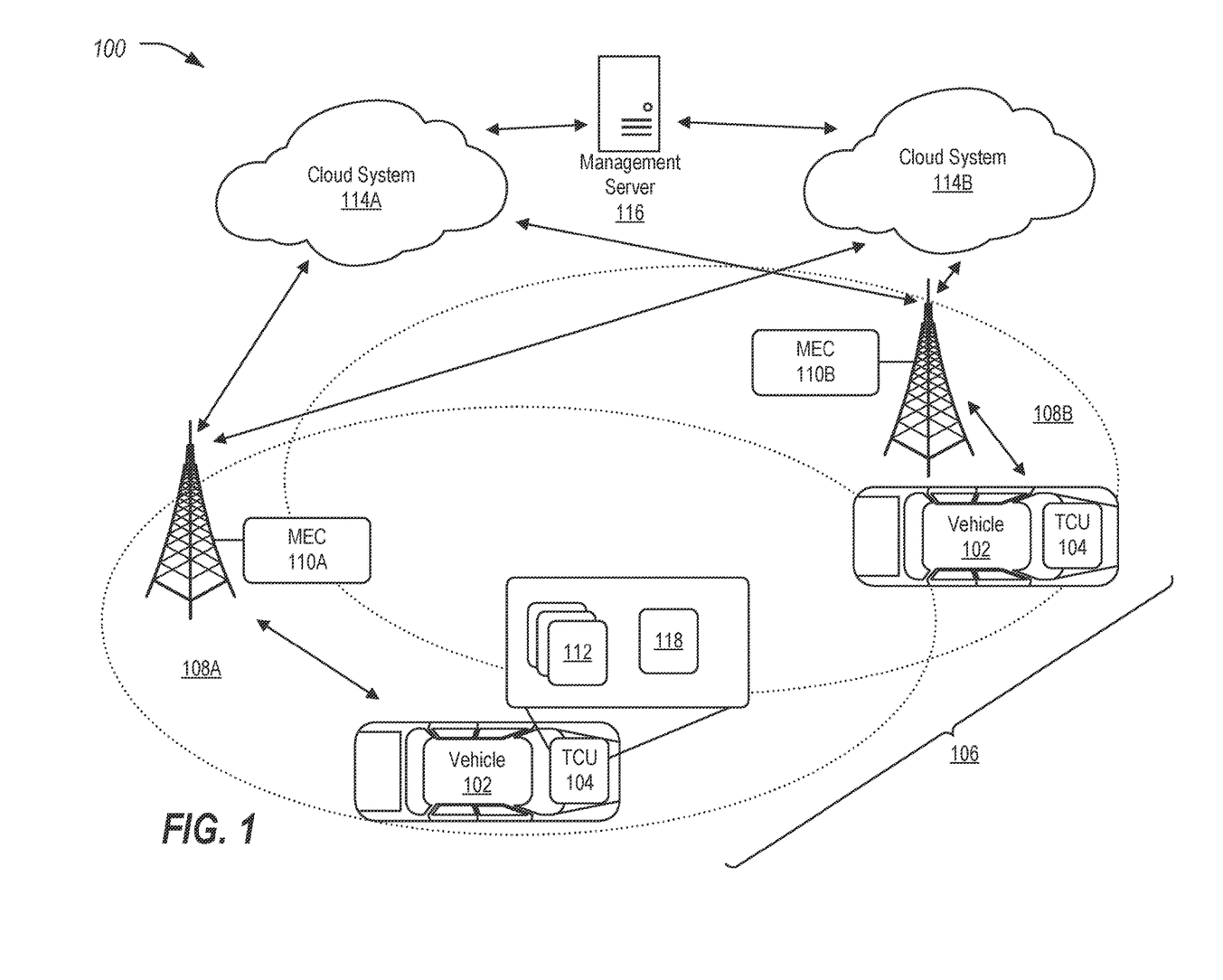
FIG. 1 illustrates an example system utilizing a management server for managing vehicle application usage of MECs and cloud systems.

FIG. 1 illustrates an example system 100 utilizing a management server 116 for managing vehicle application 112 usage of MECs 110 and cloud systems 114. Vehicles 102 of the system 100 may include TCUs 104 configured to communicate with service areas 108 of the system 100. The TCUs 104 may be configured to execute various vehicle applications 112, where the vehicle applications 112 may have varying requirements. As shown, the system 100 includes a communications network 106 that defines two service areas 108 (108A and 108B), where each service area 108 includes a corresponding MEC 110. This is simply an example, and communications networks 106 having greater quantities of service areas 108 and MECs 110 are contemplated. The system 100 also includes a plurality of cloud systems 114 configured to communicate with the communications infrastructure in the service areas 108. The management server 116 may configured to communicate with the cloud systems 114.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a plurality of controllers configured to perform and manage various vehicle 102 functions under the power of the vehicle battery and/or drivetrain. As some non-limiting vehicle controller examples: a powertrain controller may be configured to provide control of engine operating components (e.g., idle control components, fuel delivery components, emissions control components, etc.) and for monitoring status of such engine operating components (e.g., status of engine codes); a body controller may be configured to manage various power control functions such as exterior lighting, interior lighting, keyless entry, remote start, and point of access status verification (e.g., closure status of the hood, doors and/or trunk of the vehicle 102); a radio transceiver controller may be configured to communicate with key fobs, mobile devices, or other local vehicle 102 devices; an autonomous controller may be configured to provide commands to control the powertrain, steering, or other aspects of the vehicle 102; a climate control management controller may be configured to provide control of heating and cooling system components (e.g., compressor clutch, blower fan, temperature sensors, etc.); a global navigation satellite system (GNSS) controller may be configured to provide vehicle location information; and a human-machine interface (HMI) controller may be configured to receive user input via various buttons or other controls, as well as provide vehicle status information to a driver, such as fuel level information, engine operating temperature information, and current location of the vehicle 102. The vehicle 102 may also be configured to power other devices external to the vehicle using the vehicle battery and/or drivetrain.

The vehicle bus may include various methods of communication available between the vehicle controllers, as well as between the TCU 104 and the vehicle controllers. As some non-limiting examples, a vehicle bus may include one or more of a vehicle controller area network (CAN), an Ethernet network, and a media-oriented system transfer (MOST) network. Further aspects of the layout and number of vehicle buses are discussed in further detail below. The TCU 104 may include network hardware configured to facilitate communication between the vehicle controllers and with other devices of the system 100. For example, the TCU 104 may include or otherwise access a cellular modem configured to facilitate communication with other vehicles 102 or with infrastructure. The TCU 104 may, accordingly, be configured to communicate over various protocols, such as with a communication network over a network protocol (such as Uu). The TCU 104 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The communications network 106 may include one or more interconnected communication networks such as the Internet, a cable television distribution network, a satellite link network, a local area network, and a telephone network, as some non-limiting examples. The TCU 104 may include network hardware configured to facilitate communication between the vehicle 102 and other devices of the system 100. For example, the TCU 104 may include or otherwise access a cellular modem configured to facilitate communication with the communications network 106.

The communications network 106 may include one or more service areas 108 including networking and computing resources. In an example, the service areas 108 may include antennas configured to wirelessly communicate with the wireless transceivers of the devices of the system 100. In another example, the service areas 108 may include one or more MECs 110 configured to provide computing resources to the service areas 108. As the MECs 110 are located at the periphery of the communications network 106, the MECs 110 may be able to handle computing tasks local to the devices in communication with the communications network 106, without the transmission of data through the communications network 106.

The vehicle applications 112 may include programs to perform various functions utilizing the network and/or compute services of the communications network 106. As some examples, the vehicle applications 112 may include programs to provide directions, stream media, track weather conditions, track fleet location, monitor health of the vehicle 102, etc. As the functions of the vehicle applications 112 vary, the network and computing requirements for the vehicle applications 112 may also vary. For instance, some vehicle applications 112 may require broadband access, some vehicle applications 112 desire a low latency connection, and some vehicle applications 112 may require high computing assistance.

The cloud systems 114 may include additional computing resources that may be available to the service areas 108. However, the cloud systems 114 may be further in network distance from the vehicles 102 as compared to the relative local nature of the MECs 110. In some instances the cloud systems 114 may be accessed by the vehicle applications 112 over the public Internet. The MECs 110 may also be location-based, for example, the MEC 110A may be assigned to a first metropolitan area, while the MEC 110B may be assigned to a second, different metropolitan area. The cloud systems 114 may have even bigger coverage, for example, cloud systems 114A for the West coast, while cloud systems 114B for the East coast.

The management server 116 may be a networked computing device configured to control the configuration of the system 100. In an example, the management server 116 may be operated by a manufacturer of the vehicles 102. In another example, the management server 116 may be operated by a fleet manager of the vehicles 102.

The TCU 104 may additionally maintain APN information 118 for use in connecting the vehicle applications 112 to the communications network 106. The APN information 118 may include, for example, a mapping of identifiers of the vehicle applications 112 to a corresponding APN to be used to connect the vehicle application 112 to the communications network 106. Each APN may point to a MEC 110 and/or to a cloud system 114 with computing capabilities corresponding to the vehicle application 112, for example, low latency, high reliability, high computing, broadband, etc.

In an example, the APN information 118 may be installed to the TCUs 104 of the vehicles 102 at manufacture. In another example, the APN information 118 may be downloaded to the TCUs 104 of the vehicles 102 from the management server 116. The APN information 118 may be maintained to a SIM of the TCU 104 for instance.

Figure 2:
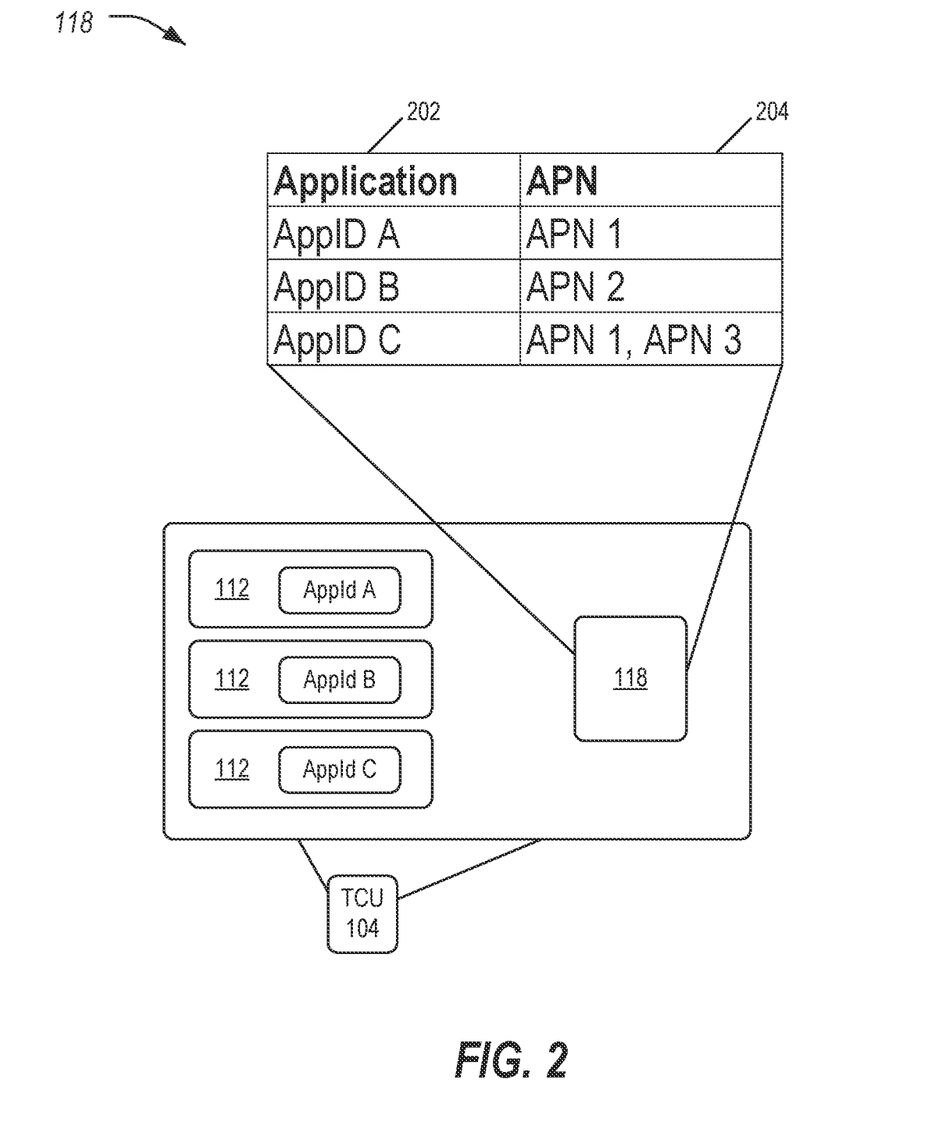
FIG. 2 illustrates an example of APN information for an example set of vehicle applications.

FIG. 2 illustrates an example of APN information 118 for an example set of vehicle applications 112. As shown, the APN information 118 includes application identifiers 202 of three applications, where each of the application identifiers 202 is associated with one or more APNs 204 that the TCU 104 may use to connect to the communications network 106 for use by the vehicle application 112. Each vehicle application 112 may embed or otherwise be associated with a corresponding unique application identifier 202. When the vehicle application 112 is run, this application identifier 202 may be extracted, and compared to the entries in the APN information 118 to identify the proper APN 204 (or set of APNs 204) to use. For instance, the vehicle application 112 having AppID A may utilize APN 1, the vehicle application 112 having AppID B may utilize APN 2, and the vehicle application 112 having AppID B may utilize APNs 1 or 3.

Figure 3:
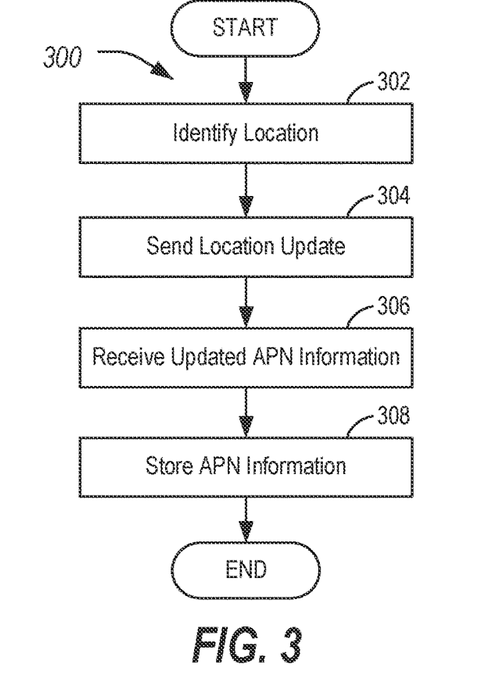
FIG. 3 illustrates an example process for the vehicle to receive updated APN information from the management server.

FIG. 3 illustrates an example process 300 for the vehicle 102 to receive updated APN information 118 from the management server 116. In an example, the process 300 may be performed by one of the vehicles 102 in the context of the system 100.

At operation 302, the vehicle 102 identifies the location of the vehicle 102. In an example, the vehicle 102 may utilize GNSS functionality of a controller of the vehicle 102 to determine the vehicle 102 location. In another example, the vehicle 102 may utilize its network location on the communications network 106 to determine the vehicle 102 location, such as via a lookup of geolocation information to internet protocol (IP) or other network address.

At operation 304, the vehicle 102 sends a location update to the management server 116. In an example, the vehicle 102 sends the location identified at operation 302 in a message over the communications network 106. The management server 116 may accordingly receive the information indicating the location of the vehicle 102.

At operation 306, the vehicle 102 receives updated APN information 118 from the management server 116. In an example, the management server 116 may utilize the updated location of the vehicle 102 to provide an update on which APNs 204 should be used for the vehicle applications 112 based on the updated location of the vehicle 102. Further aspects of the updated APN information 118 are discussed with respect to the process 400.

At operation 308, the vehicle 102 stores the APN information 118 for later use. In an example, the APN information 118 is stored to a storage of the TCU 104. In another example the APN information 118 is stored to the SIM of the TCU 104 corresponding to the communications network 106. After operation 308, the process 300 ends.

Figure 4:
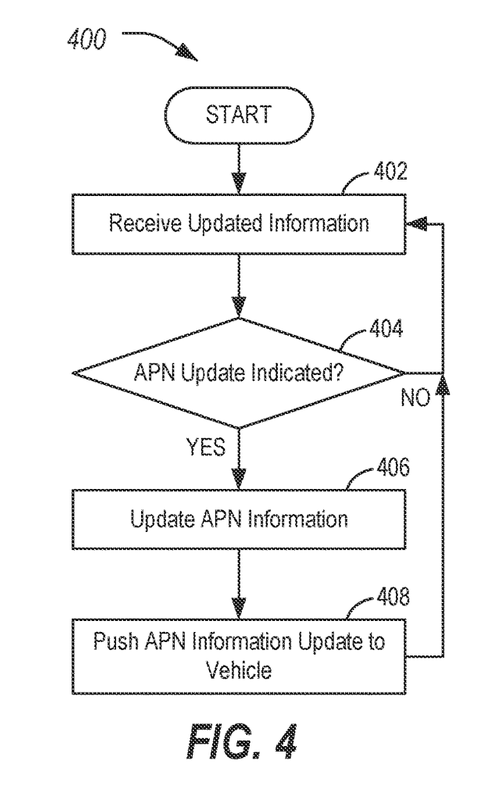
FIG. 4 illustrates an example process for the management server providing dynamic APN information to the vehicle to allow the vehicle to provide services of the communications network to the vehicle applications.

FIG. 4 illustrates an example process 400 for the management server 116 providing dynamic APN information 118 to the vehicle 102 to allow the vehicle 102 to provide services of the communications network 106 to the vehicle applications 112.

At operation 402, the management server 116 receives updated information for use in determining the mapping of APNs 204 to vehicle applications 112. In an example, the updated information may include a change in the location of the vehicle 102, a change in the time of day, a change in the day of the week, an update to the requirements of the vehicle application 112 (e.g., based on a update to the vehicle application 112 or its configuration), updated information with respect to the capabilities of the APNs 204, updated information with respect to available resources of the MECs 110, updated information with respect to available resources of the cloud systems 114, updated information with respect to available communication resources of the communications networks 106, etc. The updated information regarding the location of the vehicles 102 may be received to the management server 116 in accordance with the process 300. In another example, the location of the vehicles 102 may be inferred by the management server 116 based on the network addresses of the messages being sent or received to the vehicles 102.

At operation 404, the management server 116 determines whether an update of the APN information 118 is indicated. In an example, the management server 116 may be configured to update the APN 204 assignment to the application identifiers 202 of the vehicle applications 112 based factors indicated by the updated information. In another example, the management server 116 may additionally or alternately be configured to periodically update the APN information 118. If the received information indicates a change should be made, or the periodic update time has been reached, control passes to operation 406. If not, control returns to operation 402.

At operation 406, the management server 116 updates the APN information 118. In an example, the management server 116 may update the mapping of application identifiers 202 to APNs 204 to better fulfill the requirements of the vehicle applications 112. In an example, the management server 116 may match the requirements of the vehicle applications 112 to the capabilities of the APNs 204 to compose the APN information 118.

At operation 408, the management server 116 pushes the updated APN information 118 to the vehicles 102. The updated APN information 118 may be received to the vehicles 102 as discussed with respect to the process 300. After operation 408, control returns to operation 402.

It should be noted that variations on the process 400 are possible. In another example, the vehicle 102 may perform the operations of the process 400 locally to determine the best APNs 204 to use, without the services of the management server 116.

Figure 5:
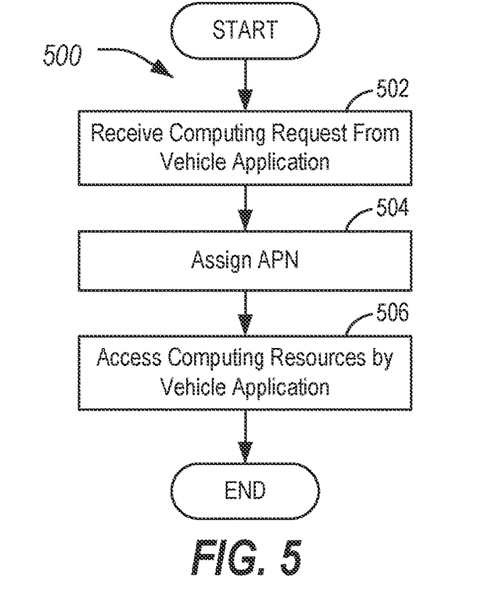
FIG. 5 illustrates an example process for the vehicle utilizing the APN information to provide services of the communications network to the vehicle applications.

FIG. 5 illustrates an example process 500 for the vehicle 102 utilizing the APN information 118 to provide services of the communications network 106 to the vehicle applications 112. In an example, the process 500 may be performed by one of the vehicles 102 in the context of the system 100.

At operation 502, the vehicle 102 receives a computing request from a vehicle application 112. In an example, the computing request may be for processing to be performed by a MEC 110 or cloud system 114. In another example, the computing request may be for network usage of the communications network 106, such as a download or upload. In yet another example, the computing request may be the startup or activation of the vehicle application 112.

At operation 504, the vehicle 102 assigns an APN 204 to the vehicle application 112. In an example, as shown in FIG. 2, the TCU 104 may identify the application identifier 202 of the vehicle application 112 and may look up the corresponding APN 204 for the application identifier 202 in the APN information 118.

At operation 506, the vehicle 102 provides the vehicle application 112 with access to the computing resources via the APN 204. These resources may include, for example, network communication over the communications network 106, computing resources of the MEC 110, computing resources of the cloud system 114, etc. After operation 506, the process 500 ends.

It should be noted that the approach described above for one vehicle application 112 may be used concurrently for more than one vehicle application 112 having different requirements. The vehicle 102 may have more than one vehicle application 112 running, where each vehicle application 112 may have different remote computing needs, e.g., different requirements with respect to latency, computing, broadband, etc. For instance, a first vehicle application 112 may perform intersection traffic dynamics and user detection/notification from the MEC 110. This first vehicle application 112 may require a low latency connection. A second vehicle application 112 may perform a dynamic traffic map build, or a fast route calculation and may require greater computing resources. A third vehicle application 112 may perform video sharing/streaming and may require a broadband connection. The vehicle application 112 may send the computing request to the TCU 104. The TCU 104 may assign the APN 204 that meets the demands of the vehicle application 112 to the vehicle application 112. In some examples, the APN information 118 may specify different APNs 204 based on current vehicle 102 location, and the TCU 104 may select the APN 204 corresponding to the current location of the vehicle 102.

The OEM, fleet manager, or other management server 116 maintainer may run more MEC 110 instances during peak times and fewer instances during off peak times to save resources. Thus, some APNs 204 may only be available at peak times. Thus, the APN information 118 may assign different APNs 204 for a vehicle application 112 based on the time period. The APN information 118 may also assign the same APN 204 to multiple vehicle application 112. Thus, each vehicle application 112 may not necessarily require its own APN 204. The APN information 118 may also include multiple APNs 204 for a single vehicle application 112 to provide for redundancy.

The management server 116 and/or the TCUs 104 may send requests to the MECs 110 and/or the cloud systems 114 to receive updates with respect to availability of the MECs 110 and/or the cloud systems 114. Based on the network computing load, the MECs 110 and cloud systems 114 may also send feedback to the vehicles 102 to indicate to the vehicles 102 the real-time available computing capabilities, for example, processing time has increased (e.g., by 20%), computing power is degraded, broadband is degraded (e.g., now only 30 Mbps is available), low latency is back to normal (as 30 ms), broadband is back to normal (as 100 Mbps), etc.

The TCU 104 may receive the feedback and may also measure the latency from the requests sent from the vehicle 102 to the MECs 110 and/or the cloud systems 114. Thus, TCU 104 may have the latest capability data for the MECs 110 and/or the cloud systems 114. As a result, the TCU 104 may assign an appropriate APN 204 to meet the vehicle application 112 demands. Utilizing the adaptive network APN 204 selection, overall vehicle application 112 performance may be improved.

In some implementations, the TCU 104 may include dual SIM or more SIMS to support dual or more network operators. Thus, in such an example there may be more flexibility for vehicle applications 112 to use different APN 204 across multiple communications networks 106.

As another possibility, the management server 116 may set a high priority APN 204 to all vehicles 102 in a region to force all vehicle applications 112 to use that high priority APN 204. In this case, the TCU 104 may take the high priority APN 204 and ignore the requirements specified by the vehicle application 112. This may be useful when the management server 116 has special requirements for a given timeframe, such as priority use of other resources or outages of various network components. Of course, the management server 116 may remove the high priority APN 204 by a further update once the special requirements are no longer relevant. For instance, the management server 116 may send updated APN information 118 to all the vehicles 102 in the region. Or the high priority APN 204 may be specified by the APN information 118 with a time limit, for example, only during the night from 10:00 pm~5:00 am.

Figure 6:
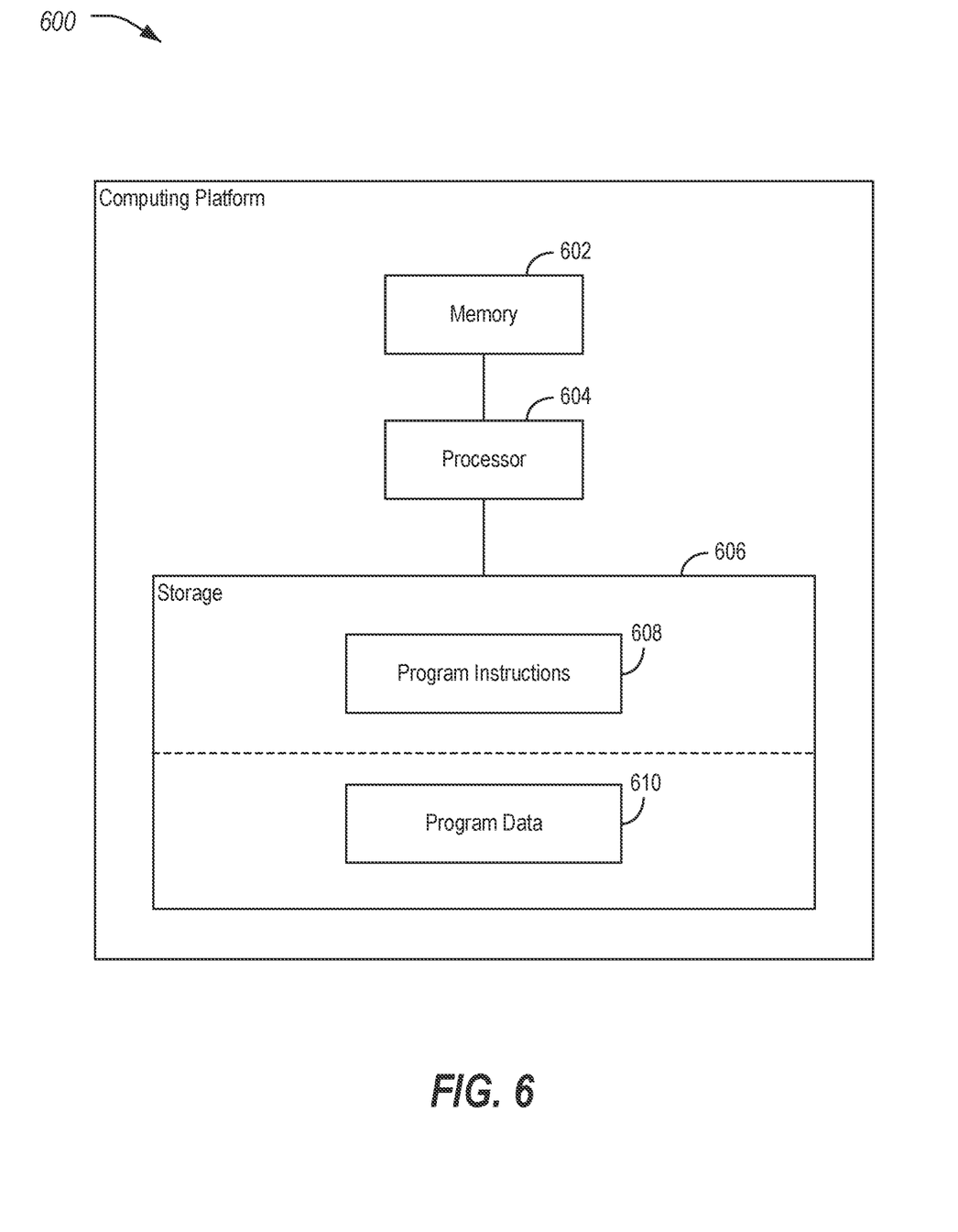
FIG. 6 illustrates an example computing device for managing vehicle application usage of MECs and cloud systems.

FIG. 6 illustrates an example computing device 600 for managing vehicle application 112 usage of MEC 110 and cloud systems 114. Devices discussed herein, such as the vehicles 102 and the management server 116 may include devices such as the computing device 600. Likewise, the operations performed herein, such as those of the processes 300 and 400, may be implemented with such a computing device 600. The computing device 600 may include memory 602, processor 604, and non-volatile storage 606. The processor 604 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 602. The memory 602 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 606 may include one or more persistent data storage devices such as a hard drive, optical drive, tape drive, non-volatile solid-state device, cloud storage or any other device capable of persistently storing information.

The processor 604 may be configured to read into memory 602 and execute computer-executable instructions residing in program instructions 608 of the non-volatile storage 606 and embodying algorithms and/or methodologies of one or more embodiments. The program instructions 608 may include operating systems and applications. The program instructions 608 may be compiled or interpreted from computer programs created using a variety of programming languages and/or technologies, including, without limitation, and either alone or in combination, Java, C, C++, C #, Objective C, Fortran, Pascal, Java Script, Python, and Perl.

Upon execution by the processor 604, the computer-executable instructions of the program instructions 608 may cause the computing device 600 to implement one or more of the algorithms and/or methodologies disclosed herein. The non-volatile storage 606 may also include data 610 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for managing vehicle application usage of computing resources, comprising:
one or more vehicle controllers of a vehicle programmed to:
receive a request for computing resources of a communications network from a vehicle application installed to the vehicle;

receive APN information from a management server;
assign an access point name (APN) to the vehicle application based on an application identifier corresponding to the vehicle application by accessing the APN information including a mapping of application identifiers to corresponding APNs;
access the computing resources by the vehicle application connecting to the communications network using the APN;
send an updated location of the vehicle to the management server;
receive updated APN information from the management server, the updated APN information including an updated mapping of the application identifiers to the corresponding APNs; and
update the stored APN information to include the updated APN information.

2. The system of claim 1, wherein the request for the computing resources is startup or activation of the vehicle application.

3. The system of claim 1, where in the APN information is stored to a subscriber identity module (SIM) of the vehicle.

4. The system of claim 1, wherein the APN is configured to allow the vehicle application access to one or more predefined multi-access edge computing (MEC) devices and/or cloud systems.

5. The system of claim 1, wherein the APN is configured to allow the vehicle application access to network resources with a defined throughput and/or latency.

6. The A system for managing vehicle application usage of computing resources, comprising:
one or more vehicle controllers of a vehicle programmed to:
receive a request for computing resources of a communications network from a vehicle application installed to the vehicle;
assign an access point name (APN) to the vehicle application based on an application identifier corresponding to the vehicle application by accessing stored APN information including a mapping of one of the application identifiers to a first APN for a first vehicle location and a second APN for a second vehicle location;
determine a current location of the vehicle;
assign the first APN to the vehicle application responsive to the current location matching the first vehicle location; and
assign the second APN to the vehicle application responsive to the current location matching the second vehicle location.

7. A system for managing vehicle application usage of computing resources, comprising:
a management server programmed to:
receive updated information with respect to performance of computing resources of a plurality of MECs and/or cloud systems accessible to vehicle applications over a communication network;
generate an APN information mapping of application identifiers of the vehicle applications to corresponding APNs; and
push the APN information to vehicles to allow the vehicles to assign APNs to the vehicle applications based on application identifiers corresponding to the vehicle applications.

8. The system of claim 7, wherein the management server is further programmed to generate and push the APN information periodically.

9. The system of claim 7, wherein the management server is further programmed to generate and push the APN information responsive to receipt of updated information with respect to the performance of computing resources.

10. The system of claim 7, wherein the updated information with respect to the performance of the computing resources includes a change in location of the vehicles.

11. The system of claim 7, wherein the updated information with respect to the performance of the computing resources includes a change in time of day and/or day of week.

12. The system of claim 7, wherein the updated information with respect to the performance of the computing resources includes an update to requirements of the vehicle applications.

13. The system of claim 7, wherein the updated information with respect to the performance of the computing resources includes a change in available resources of the MECs, updated information with respect to available resources of the cloud systems, and/or updated information with respect to available communication resources of the communication network.

14. A method for managing vehicle application usage of computing resources, comprising:
receiving a request for computing resources of a communication network from a vehicle application installed to a vehicle;
assigning an access point name (APN) to the vehicle application based on an application identifier corresponding to the vehicle application by accessing stored APN information including a mapping of application identifiers to corresponding APNs;
accessing the computing resources by the vehicle application connecting to the communication network using the APN;
sending an updated location of the vehicle to a management server;
receiving updated APN information from the management server, the updated APN information including an updated mapping of the application identifiers to the corresponding APNs; and
updating the stored APN information to include the updated APN information.

15. A method for managing vehicle application usage of computing resources, comprising:
receiving a request for computing resources of a communication network from a vehicle application installed to a vehicle;
assigning an access point name (APN) to the vehicle application based on an application identifier corresponding to the vehicle application by accessing stored APN information including a mapping of application identifiers to corresponding APNs;
accessing the computing resources by the vehicle application connecting to the communication network using the APN;
receiving, by a management server, updated information with respect to performance of computing resources of a plurality of MECs and/or cloud systems accessible to vehicle applications over the communication network;
generating updated APN information based on the updated information; and
pushing the updated APN information to the vehicle.

16. The method of claim 15, further comprising generating and pushing the updated APN information responsive to receipt of the updated information with respect to the performance of computing resources.

17. The method of claim 16, wherein the updated information includes an updated location of the vehicle.

* * * * *